(12) United States Patent
Arciniegas et al.

(10) Patent No.: US 6,929,403 B1
(45) Date of Patent: Aug. 16, 2005

(54) SMALL FORM-FACTOR PLUGGABLE BAIL LATCH

(75) Inventors: German Arciniegas, Fremont, CA (US); Lin Zhang, Fremont, CA (US)

(73) Assignee: Opnext, Inc., Fremont, CA (US)

(*) Notice: Subject to any disclaimer, the term of this patent is extended or adjusted under 35 U.S.C. 154(b) by 66 days.

(21) Appl. No.: 10/364,685

(22) Filed: Feb. 10, 2003

(51) Int. Cl.⁷ .................... G02B 6/38; H01R 13/627
(52) U.S. Cl. ............................ 385/55; 439/352
(58) Field of Search .................. 385/55, 75, 76, 385/77, 92; 439/352, 372

(56) References Cited

U.S. PATENT DOCUMENTS

| | | | | |
|---|---|---|---|---|
| 4,260,210 A | * | 4/1981 | Babuka et al. | 339/91 |
| 5,019,769 A | * | 5/1991 | Levinson | 372/31 |
| 5,901,263 A | * | 5/1999 | Gaio et al. | 385/92 |
| 6,439,918 B1 | * | 8/2002 | Togami et al. | 439/272 |
| 6,494,623 B1 | * | 12/2002 | Ahrens et al. | 385/76 |
| 6,553,603 B1 | * | 3/2003 | Togami | 439/372 |

* cited by examiner

*Primary Examiner*—Chandrika Prasad
(74) *Attorney, Agent, or Firm*—Finnegan, Henderson, Farabow, Garrett & Dunner LLP

(57) ABSTRACT

An optical module having a latching mechanism to allow the module to be latched to a cage of a host system is disclosed. The latching mechanism includes a latch boss that can be engaged by a latch attached to the host cage to capture the module. The latching mechanism also includes a latch key that slides towards the latch boss to disengage the latch from the latch boss. The latch key is moved by a bail that rotates and exerts a force on the latch key by a cam surface.

16 Claims, 7 Drawing Sheets

SMALL FORM-FACTOR PLUGGABLE BAIL LATCH

FIELD OF THE INVENTION

This invention is generally related to latch mechanisms for use on optical transceiver modules. In particular, embodiments of the present invention relate to latching mechanisms that allow modules to be densely packed within a host and that do not require an extraction tool to remove the modules from the host.

BACKGROUND OF THE INVENTION

Optical fibers are increasingly used for data communications. Optical fibers have several advantages over conventional electrical wires. For example, optical fibers are more resistant to electro-magnetic interference and have higher data transmission rates. Communications through optical fibers are also more secure than by electrical wire since the signal does not create an electromagnetic field as an electrical signal does. Also, data may be transmitted over greater distances without suffering as much signal loss as that encountered in copper wires.

Typically, optical signals are converted to electrical signals when they reach their destination so that the data contained in the optical signals can be processed by conventional electronic devices. Similarly, data that is in the form of electrical signals must be converted to optical signals before being transmitted through optical fibers. Typically, such conversion is done by modules that are connected to both a host system and to one or more optical fibers.

Connection to a host system must be mechanically secure so that the module is not unintentionally disconnected from the host, for example when the optical fiber is moved. It must also be possible to remove the module when required without affecting neighboring modules. This is normally achieved with a latching mechanism that holds the module in place within the host system until the latching mechanism is de-latched prior to removal of the module.

Standards exist for the design of transceiver modules of this kind. One such standard is the Small Formfactor Pluggable (SFP) Multi Sourcing Agreement (MSA). This agreement requires that the module conform to certain specifications of size and shape, and also governs the electrical interface used. The SFPMSA standard also requires modules to be hot-pluggable, that is, they must be capable of being inserted or removed from the host system while the power is turned on. To facilitate removal, it is usually necessary to allow a space between modules to permit access to a latching mechanism located on the sides of the module. This prevents such modules from being used in systems with high port density unless an extraction tool is employed. Extraction tools are undesirable for a number of reasons including convenience, cost and compatibility with other systems.

Therefore, there is a need for a module that is capable of being securely held in a host system, capable of being withdrawn from the host system when needed, is compatible with a high port density system and conforms to the SFP standard. In addition such a module should require no special extraction tool and should allow extraction without affecting neighboring modules. Specifically, a latching mechanism is needed that allows high-density arrangement of hot-pluggable modules without requiring an extraction tool.

SUMMARY OF THE INVENTION

In accordance with the present invention, a latching mechanism to latch a module within a host system in a high-density arrangement of modules such that the module may be removed without the use of an extraction tool and without interfering with neighboring modules is presented.

An embodiment of the present invention uses a bail latch mechanism. In some embodiments a bail latch mechanism according to the present invention includes a bail, a latch key and a latch boss. The latch boss is fixed to the housing of the module and provides a contact point between the module and the host by which the module is held within a part of the host. The latch boss may protrude into an opening in a latch that is attached to the host cage. The latch can be displaced from the module to lift over the latch boss until the latch boss is inserted into the opening. The latch may be pushed away from the module, thus freeing the latch boss, when the module is withdrawn from the host. The latch can be displaced from the module by the action of a latch key, which in turn can be displaced by the bail.

The bail is fixed on the housing of the module and rotates about a fixed axis. The bail can include an axial portion, or shaft, that is attached to the housing of the module so that it is free to rotate. A portion of this shaft has a earn surface that is contoured so that as the shaft rotates the cam surface produces a force against the latch key, which displaces the latch key along a fixed direction.

In some embodiments, the latch key has one side contactable with the cam surface of the bail and an opposite side angled, for example wedge shaped, to contact and displace the latch when the latch key is displaced by the cam. The angled shape provides a means to disengage the latch from the module. The angled portion of the latch key is inserted between the housing of the module and the latch so that as the latch key slides, force is exerted on the latch pushing it away from the module.

The latch engages the latch boss by physically constraining the latch boss from moving. In particular, a portion of the latch blocks movement in the direction away from the host system by occupying a space adjacent to the latch boss in this direction. As the latch key moves, the latch key forces the latch out of this space. Eventually the latch ceases to block the latch boss and the module is free to move. The module may be withdrawn from the host system at this point.

At the point where the bail latch mechanism de-latches the module from the host, a portion of the bail is extended outward from the front of the module to form a grip. The grip can be utilized to pull the module from the host. Thus, the module can be removed without disturbing neighboring modules because there is no need to access the sides of the module. Also, no separate extraction tool is needed to remove the module from the host.

In some embodiments the bail may be formed from plastic. The shape of a plastic bail is easy to optimize for increased strength. The color and general appearance of a plastic bail may be selected to conform to specific requirements such as color-coding. The plastic used to form the bail may be selected to have sufficient strength to withstand the expected physical forces. Further, the elasticity of some plastics allows the bail to include a locking mechanism without damage from any deformation that occurs during the locking process.

These and other embodiments of the present invention will be discussed below with reference to the following figures.

DETAILED DESCRIPTION OF THE PREFERRED EMBODIMENTS

Figure 1A:
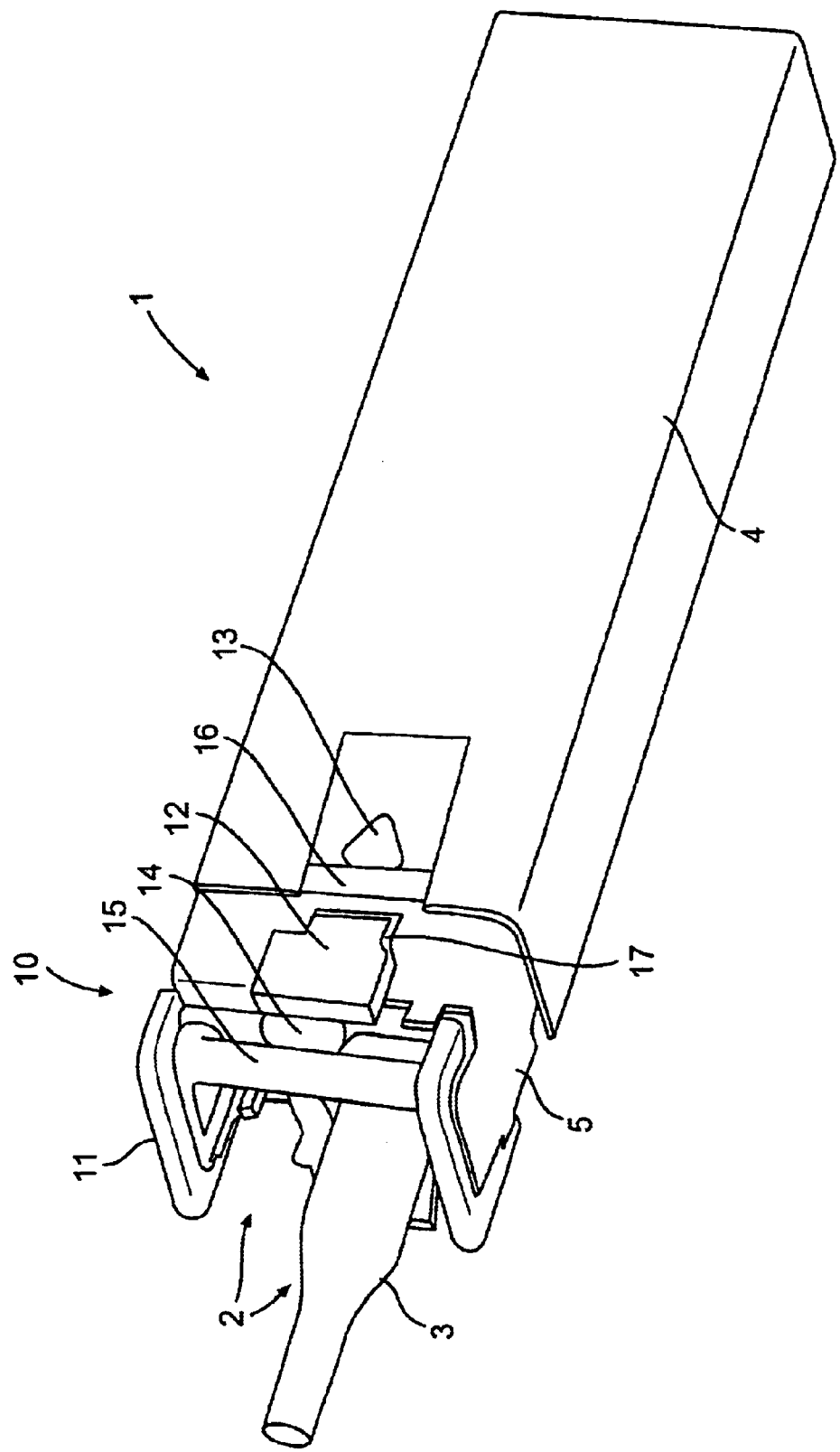
FIG. 1(*a*) shows an optical module latching mechanism according to one embodiment of the present invention.
FIG. 1(b) shows optical modules within a host system according to an embodiment of the present invention

FIG. 1(a) illustrates an embodiment of the present invention. FIG. 1(a) shows a bottom view of an optical module 1 with a bail latch mechanism 10 according to the present invention. Optical module 1 includes receptacles 2 at one end to accept optical communication connectors. A connector 3 is shown inserted into one of receptacles 2. In operation, optical module 1 is inserted into a host system (not shown), which may be a data processing system such as a network server, a mainframe computer or any other electronic system that accepts data in the form of electrical signals. Connector 3 includes an optical fiber coupling the host system to other systems optically. For example, various components of a computer network may be connected by means of optical fibers between optical modules 1.

Optical module 1 may include internal circuitry to convert optical signals to electrical signals and electrical signals to optical signals. Typically, conversions involve converting between serial optical signals and parallel electrical signals. This circuitry is usually formed on a printed circuit board (PCB). The housing 4 of optical module 1 covers the circuitry to protect it and to provide structural integrity. Housing 4 may be a single piece or may be several pieces making a single rigid assembly. For example, a separate housing portion 5 may be used for the optical connections at the front of optical module 1. Housing portion 5 is connected to the housing 4 to form a rigid assembly.

Bail latch mechanism 10 of FIG. 1(a) is used to physically secure optical module 1 within a host system. Securing optical module 1 allows the electrical connection to the host to be protected from being accidentally disconnected or disturbed. Because adjacent modules are close together there is a risk of disturbing neighboring modules when one module is being removed from the host. Also, if optical module 1 is not secured it may be disconnected from the host when the optical fiber is removed. Bail latch mechanism 10 provides a latched state in which optical module 1 is physically secured to the host, and a de-latched state in which optical module 1 may be withdrawn from the host. Normally, optical module 1 is inserted into a port in the host system. The host SFP cage assembly (host cage) forms the walls of the port. Optical module 1 is constrained vertically and laterally by the cage so that it can only move in one direction, in or out of the port. When latched, optical module 1 is captured in this direction also. When de-latched optical module 1 may be withdrawn from the cage.

Bail latch mechanism 10 includes a bail 11, a latch key 12 and a latch boss 13. Bail 11 has a shaft 15 that is mounted to the body of optical module 1 so that it can rotate. Shaft 15 may be mounted to the lower surface of optical module 1 as shown in FIG. 1(a). The length of shaft 15 is approximately the same as the width of optical module 1. At either end of shaft 15, U-shaped arms extend from it, perpendicular to its axis. These arms are designed so that the U-shaped portions may fit around the front of optical module 1. The arms are connected by a bar at the other end (not visible in FIG. 1(a)).

Shaft 15 has a cam surface 14. Cam surface 14 is contoured so that as shaft 15 rotates cam surface 14 pushes against latch key 12. Thus, cam surface 14 converts the rotational movement of bail 11 into a force that acts to displace latch key 12.

Bail 11 is located at the front of optical module 1 where it serves a dual purpose. The position of bail 11 determines the state of the mechanism, latched or de-latched, as described further below. Also, bail 11 may be used to remove optical module 1 since it provides an attachment to optical module 1 that can easily be gripped and by which optical module 1 can be pulled out of the host cage. When bail 11 is moved to the de-latched position, part of it extends clear of the front of optical module 1 where it is easily gripped without disturbing neighboring modules. Bail 11 must be capable of withstanding the force needed to de-latch the mechanism and to withdraw optical module 1. Bail 11 must also be sufficiently rigid so that it does not deform.

Bail 11 may be made of plastic. For example, a Nylon resin with 25% glass fiber may be used. One such plastic is Zytel® made by E.I. du Pont de Nemours and Company. Bails made out of metal are generally round when looked at in cross-section because they are formed from wire. Plastic bails are not limited in this way. Plastic bails may have a variety of shapes chosen to improve their mechanical properties. For example, bail 11 may be rectangular in cross-section. Also, the color of the plastic of bail 11 may be chosen to allow color-coding. Another alternative is to modify the material to make the plastic look like metal. The mechanical characteristics of plastics are well suited to this application. The stress generated in bail 11 when removing a typical module of this kind from a host system is well below the failure tensile stress of a plastic such as Zytel®. Even with an unbalanced force (i.e. the extraction force not in the direction of extraction of optical module 1) the stress generated is below the failure tensile stress. Another advantage of plastic for this purpose is that it is somewhat elastic. This allows bail 11 to be snapped into place. With careful control of the tolerances of bail 11 and opening that contains it, the bail may be forced into place without damage. The result is a simple assembly procedure.

Latch key 12 is designed to fit within a recess 16 in the body in such a way that it may slide in one direction, but is constrained from moving in any other direction. FIG. 1(a) shows latch key 12 on the bottom of optical module 1, but it could also be mounted on the top or side of optical module 1 if the host was configured to accept that configuration and the positions of the other parts of bail latch mechanism 10 were changed accordingly. Cam surface 14 of bail 11 applies a force to one end of latch key 12. The other end of latch key 12 has a wedge shaped portion 17. Wedge shaped portion 17 forms an acute angle at the bottom of recess 16 and has an angled surface extending from the bottom.

Latch boss 13 forms a protrusion from optical module 1 and remains stationary with respect to it. Latch boss 13 may be formed integral with the housing portion 5 or otherwise mounted so that its position is fixed to module 1. Having the position of latch boss 13 formed integrally with housing portion 5 reduces the number of moving parts. Moving parts are prone to stress failure and may suffer wear and fatigue over time. Therefore, reducing the number of moving parts is advantageous. Also, because latch boss 13 does not move, there is no need for a spring to bias latch boss 13. This eliminates another source of failure from the mechanism.

Figure 1B:
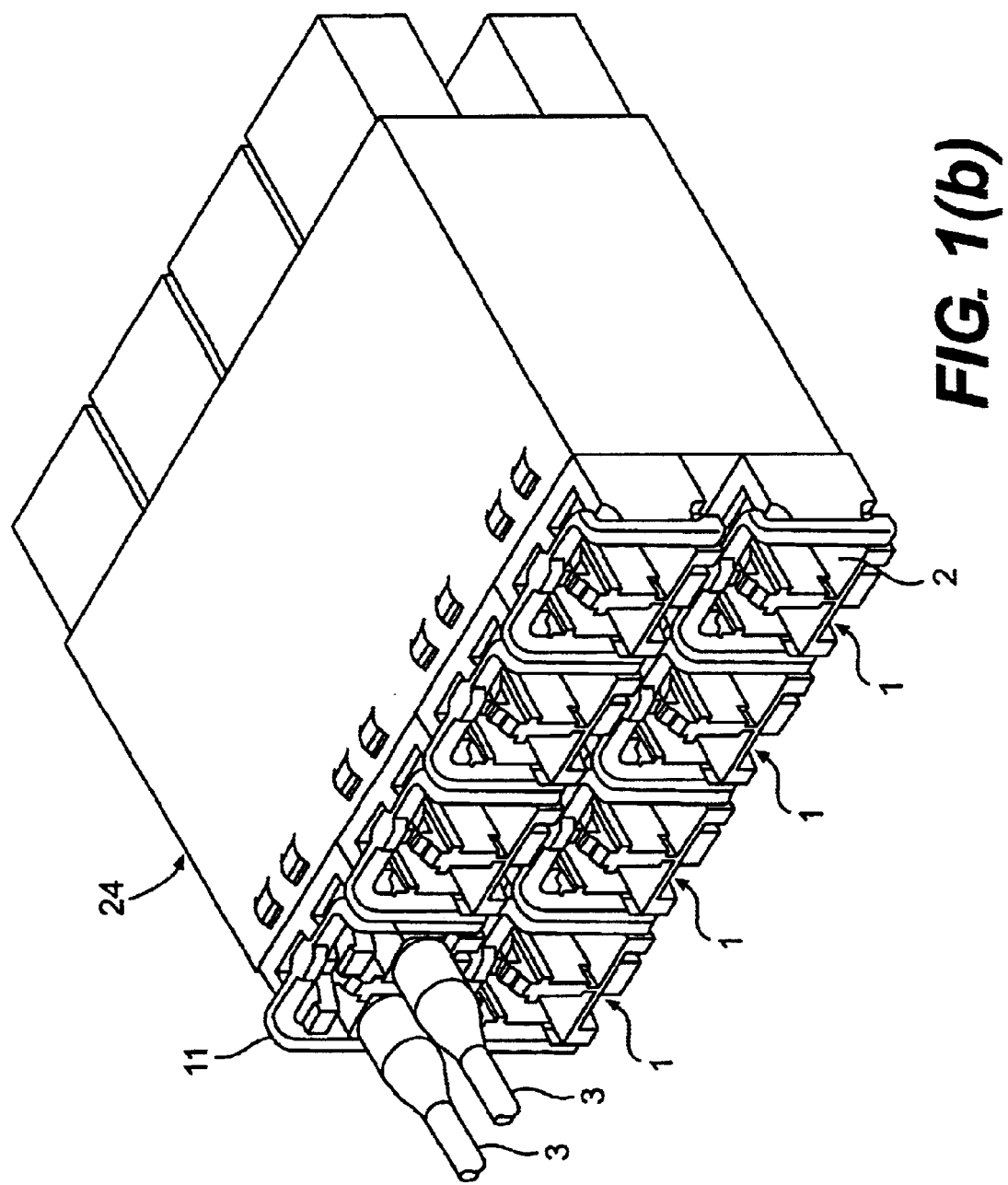

Multiple optical modules 1 may be arranged together within a host system 24 as shown in FIG. 1(b). Typically, optical modules 1 are spaced closely together to allow a large number of receptacles 2 in a given space. This allows a large number of optical connectors 3 to be connected to the host system 24. The present embodiment allows closer spacing than many similar optical modules because access to the sides of optical modules 1 is not required to insert or remove optical module 1 from the host. This is because the bail 11 can be accessed from the front of optical module 1 and used to de-latch optical module 1 from host system 24.

Figure 2A:
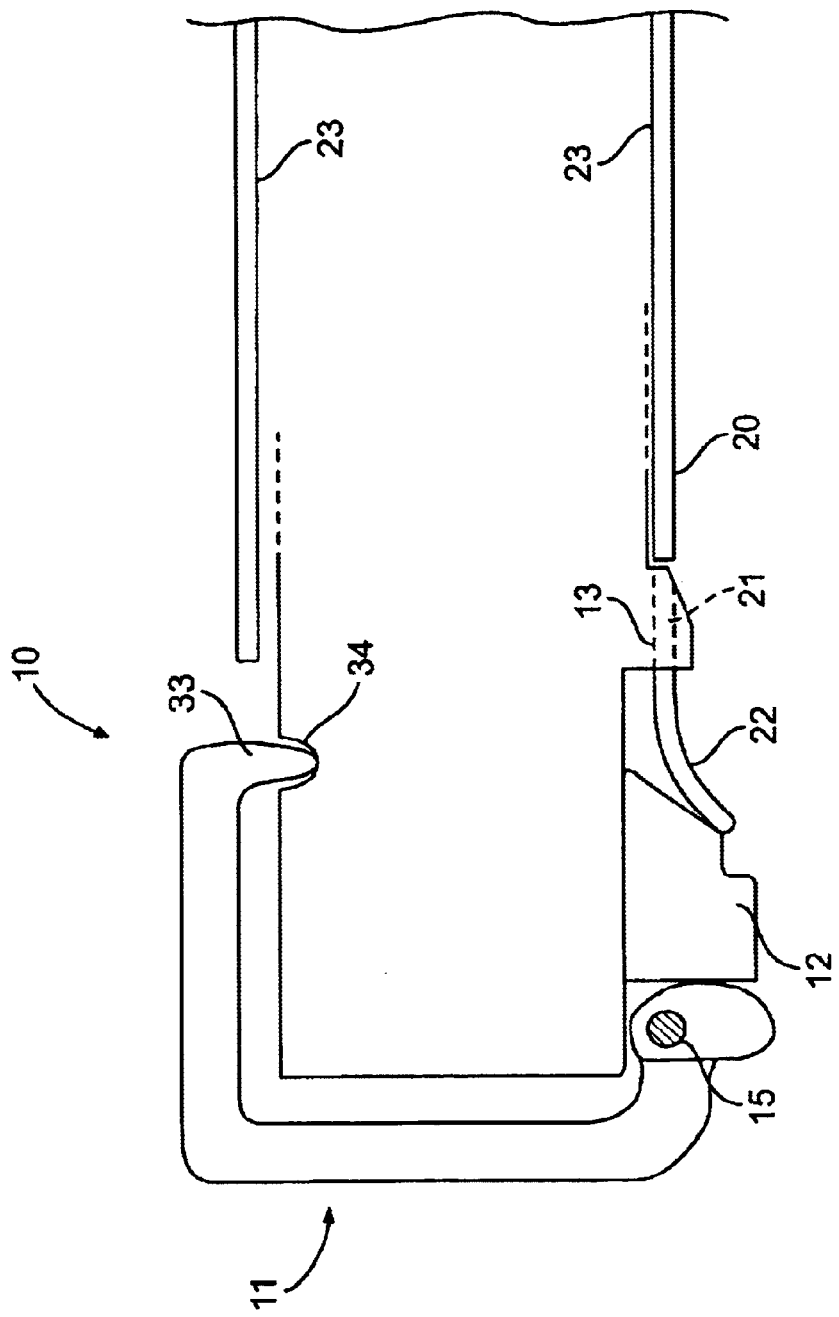
FIG. 2(a) shows an embodiment of a bail latch in the latched position.
Figure 2B:
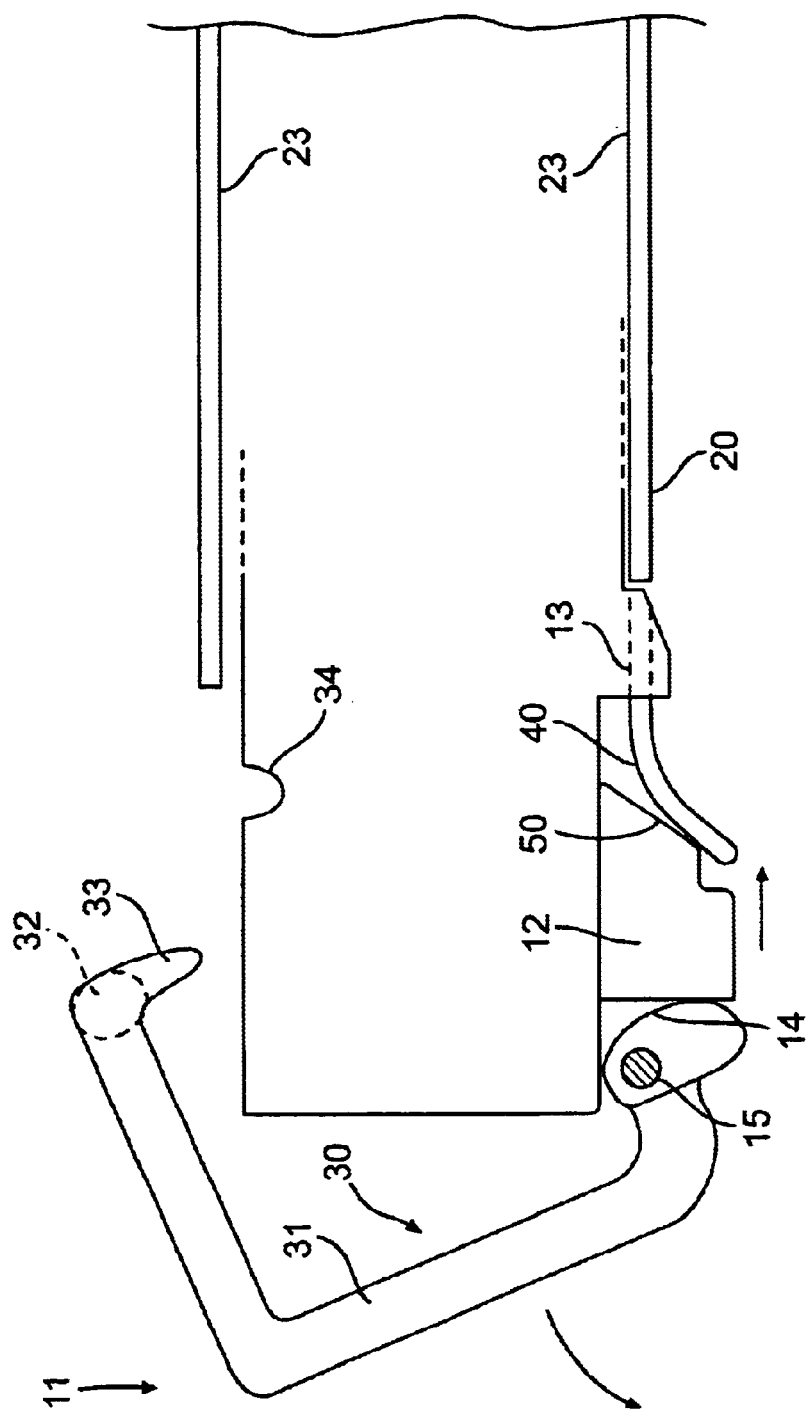
FIG. 2(b) shows an embodiment of a bail latch in an intermediate position between the latched and de-latched positions.
Figure 2C:
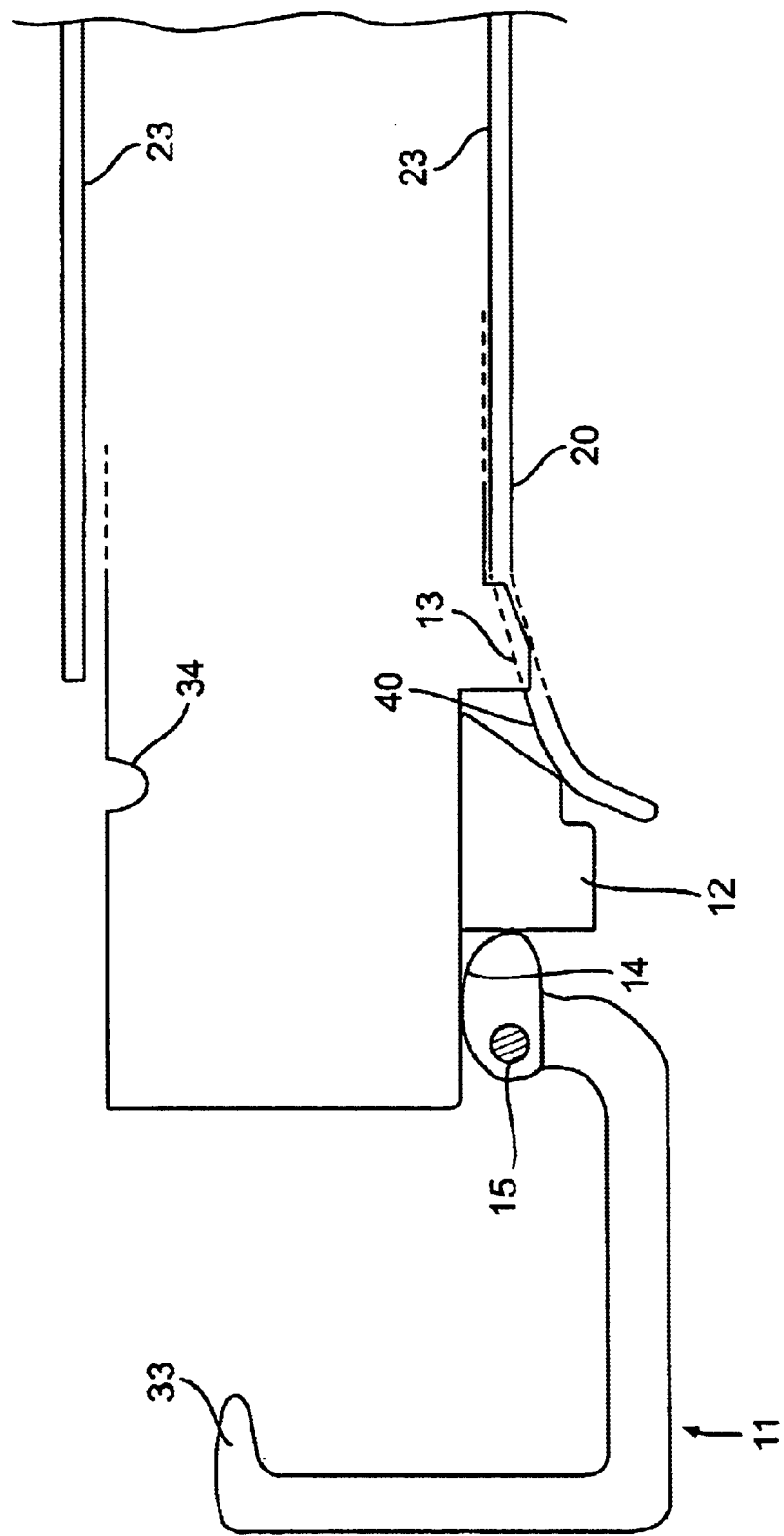
FIG. 2(c) shows an embodiment of a bail latch in the de-latched position.

The working of bail latch mechanism 10 in accordance with an embodiment of the invention will now be described. FIGS. 2(a)–2(c) show bail latch mechanism 10 as it is moved from the latched to the de-latched state. In the latched state of FIG. 2(a), optical module 1 is captured within host cage 23. In the latched state the latch 20 engages latch boss 13 and holds optical module 1 from being withdrawn from the host.

Latch 20 (also called a retention tab or tap bend) is attached to host cage 23 to engage optical module 1 and to capture it within host cage 23. The latch 20, along with other aspects of host cage 23, is governed by the MSA. Latch 20 may be made of a spring material such as Phosphor Bronze. Latch 20 has an opening 21 to engage the latch boss. The dimensions of this opening are also determined by the MSA. FIG. 2(a) shows latch 20 in a position where latch boss 13 is in opening 21 of the latch 20, and a retaining portion 22 of latch 20 blocks the latch boss, and therefore optical module 1, from moving out of the host.

Bail 11 is designed to fit closely to the front of optical module 1 and provide a low profile. A protrusion 33 may be provided at the opposite side of bail 11 from shaft 15. Protrusion 33 corresponds to a recess 34 provided in housing portion 5 to hold protrusion 33. Protrusion 33 and recess 34 hold bail 11 in place and provide a locking mechanism when in the latched position.

The latched state is the normal state of optical module 1 when it is in use. In this position, optical module 1 is electrically connected to the host system. Optical receptacles 2 at the front of optical module 1 are accessible in this state so that optical connectors 3 may be inserted or removed. Insertion and removal of connectors 3 is possible without disturbing the connection between optical module 1 and the host because optical module 1 is securely held within cage 23.

FIG. 2(b) shows bail latch mechanism 10 as it is moved from the latched state to the de-latched state. A user pulls bail 11 so that it rotates and extends outward from optical module 1. Bail 11 has a shaft portion 15 that forms the axis of rotation of the bail and a lever portion 30 that extends outward from shaft 15 and provides a grip for the user. The lever portion has an arm 31 attached to either end of shaft 15 and a bar 32 connects the arms at their other end. Shaft portion 15 has a cam surface 14 as shown. Cam surface 14 is contoured so that it produces a force against latch key 12 as bail 11 rotates. This force causes latch key 12 to move towards latch boss 13. That is, latch key 12 moves away from the front of optical module 1 as bail 11 is rotated. This motion of latch key 12 causes the latch key to exert a force against retaining portion 22 of latch 20. When optical module 1 is latched, latch 20 extends into a recess 40 between latch boss 13 and the latch key 12. As latch key 12 moves towards latch boss 13, latch key 12 occupies an increasing portion of recess 40. The surface 50 of latch key 12 as it impinges on space 40 is angled to push latch 20 outward from the body of optical module 1. Thus, as latch key 12 moves toward latch boss 13, latch 20 is displaced from recess 40. This displacement of latch 20 eventually causes it to cease to engage the latch boss. While latch key 12 slides in a direction that is from the front to the back of optical module 1, latch 20 must be pushed in a direction normal to the movement of latch key 12. Latch key 12 acts as a wedge between housing portion 5 and latch 20 so that as latch key 12 moves further towards latch boss 13, surface 50 pushes latch 20 outward from optical module 1.

FIG. 2(c) shows bail latch mechanism 10 in the de-latched state. Bail 11 is rotated so that it extends outward from the front of optical module 1. This provides a grip for extraction of optical module 1 from host cage 23. In this state, latch key 12 has moved sufficiently to displace latch 20 from recess 40 behind latch boss 13 and thus cause latch 20 to disengage. Latch 20 is no longer holding latch boss 13 and therefore optical module 1 is free to be removed from the host. Optical module 1 may be removed by simply continuing to exert an outward force on bail 11 in the direction indicated by the arrow in FIG. 2(c). Therefore, the optical module 1 may be removed from the host cage 23 by a single pull and rotate motion of the bail 11.

Figure 3A:
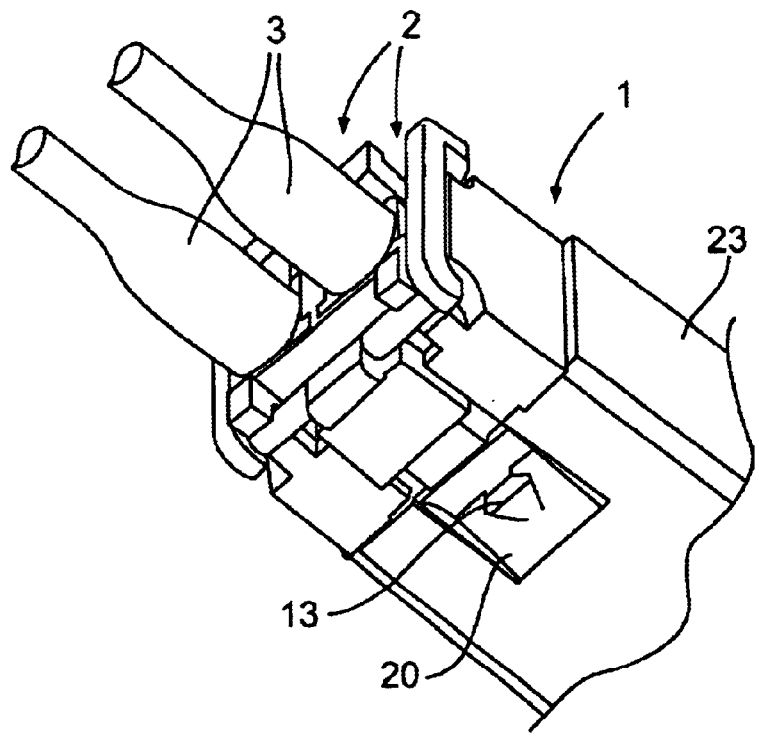
FIG. 3(a) shows an embodiment of an optical module latched within a cage.

FIG. 3(a) illustrates a bottom view of an embodiment of the present invention where an optical module 1 is latched within a cage 23 and optical connectors 3 are inserted in receptacles 2. FIG. 3(a) shows the latch 20 engaging the latch boss 13.

Figure 3B:
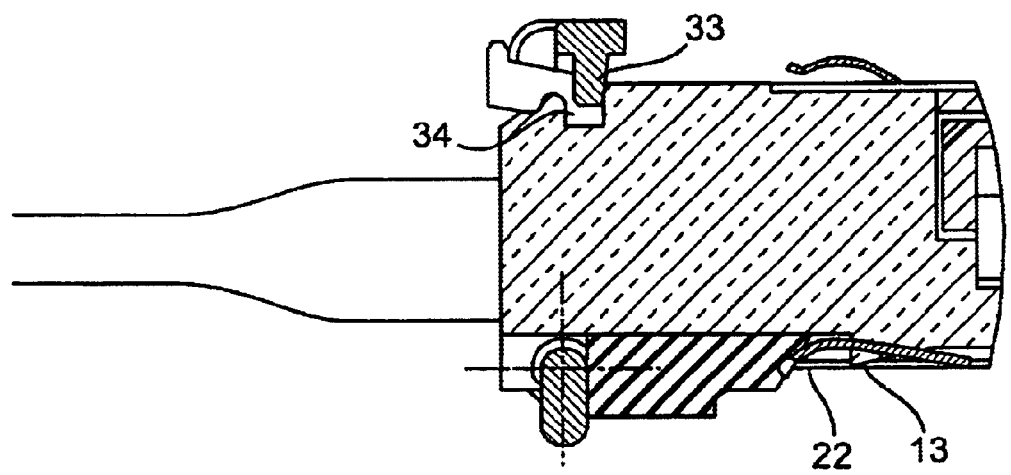
FIG. 3(b) shows a cross section of an embodiment of an optical module latched within a cage.

FIG. 3(b) illustrates in cross section, optical module 1 in the latched position. Retaining portion 22 of latch 20 blocks the latch boss 13 from moving. In this state, protrusion 33 is held within recess 34. Thus, the bail is held in the latched position.

Figure 4:
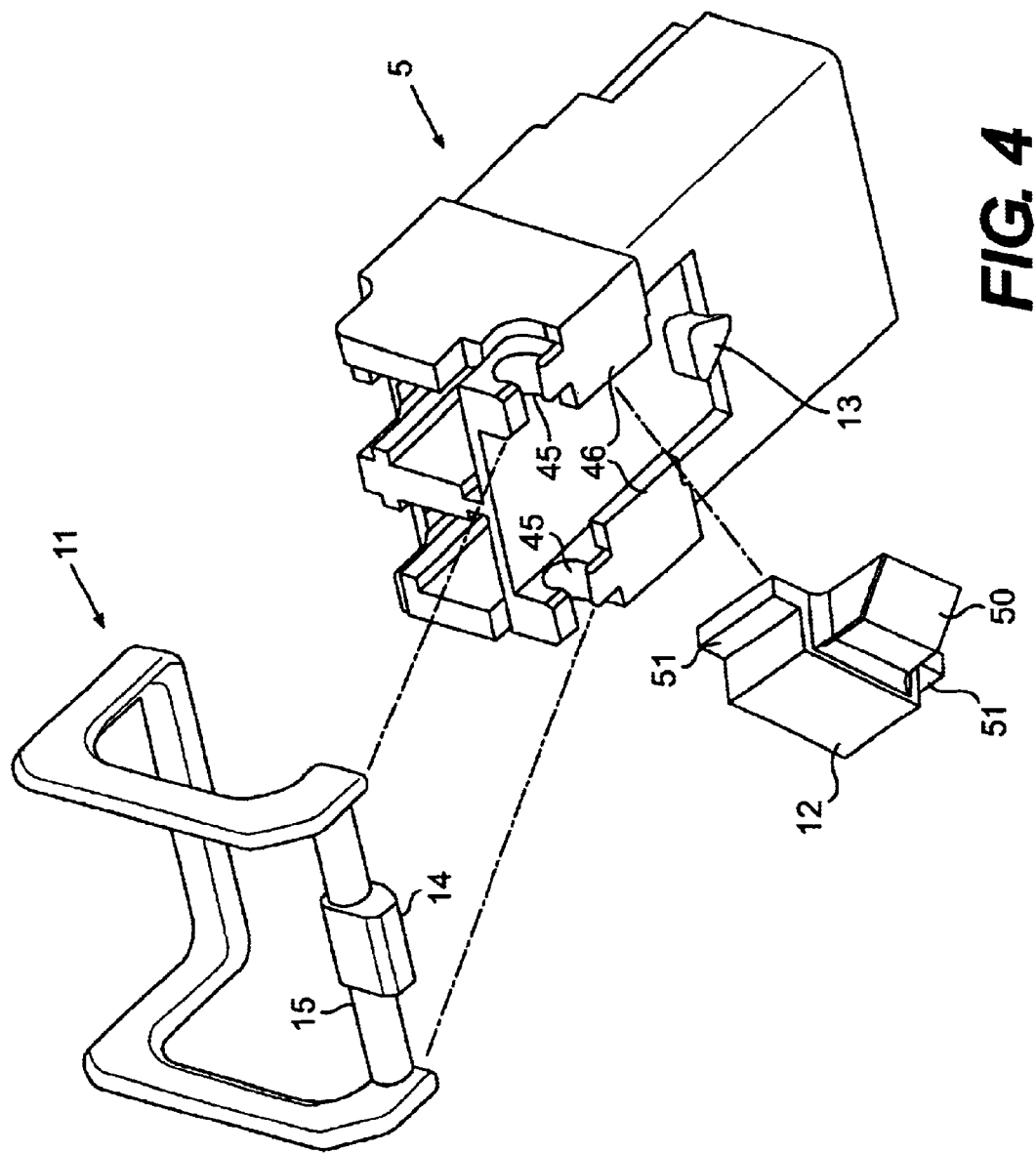
FIG. 4 shows an embodiment of a bail latch mechanism in exploded form.

FIG. 4 illustrates an example of bail latch mechanism 10 in exploded form. This perspective shows housing portion 5, bail 11 and latch key 12. Bail 11 attaches to housing portion 5 by pressing the shaft portion 15 into the corresponding openings 45 in the housing portion 5. The size of openings 45 is selected to allow the shaft 15 to be captured once it is inserted so that it remains attached. Openings 45 allow shaft 15 to rotate freely. FIG. 3 also shows the retaining portions 51 of latch key 12. Retaining portions 51 extend from latch key 12 to allow latch key 12 to be captured by housing portion 5. Housing portion 5 has retaining portions 46 that extend over retaining portions 51 and thus capture latch key 12 against housing portion 5.

The process of de-latching described above may simply be reversed to connect optical module 1 in place. Optical module 1 is inserted in host cage 23 and bail 11 is rotated until it reaches its limit with the protrusion 33 in the recess 34. In this position cam surface 14 on bail shaft 15 allows latch key 12 to move away from latch boss 13. With latch key 12 in this position the latch 20 may engage the latch boss by extending into the recess 40 between the latch boss 13 and the latch key 12.

The embodiments of this invention that have been described are examples only. Those skilled in the art will understand that variations thereof may also be possible. Therefore, the invention is entitled to protection within the full scope of the appended claims. The invention, thus, is limited only by the following claims.

We claim:

1. An optical module comprising:
   a housing;
   a latch key slidably attached in the housing;
   a latch boss fixedly attached to the housing and positioned adjacent to the latch key such that the latch key can slide in a direction towards the latch boss; and
   a bail mounted on the housing, the bail being rotatable about a shaft attached to the housing, the bail further including a cam that pushes the latch key when the bail is rotated about the shaft,
   wherein the latch boss can be engaged by a latch of a host system and wherein the latch key can displace the latch to disengage the latch from the latch boss and thus allow the optical module to be withdrawn from the host cage.

2. The module of claim 1 further comprising a recess into which the latch of a host cage may extend to secure the module to a host system.

3. The module of claim 2 wherein the latch key can partially block the recess and prevent the latch from securing the module.

4. The module of claim 1 further comprising an optical communications receptacle capable of physically receiving a corresponding optical communications connector.

5. The module of claim 1 wherein the bail comprises a shaft portion and a lever portion that extends from the optical module allowing the module to be withdrawn from the host by applying a force to the lever portion.

6. The module of claim 1 wherein the bail is made of plastic.

7. The module of claim 6 wherein said plastic is Nylon resin with about 25% glass fiber.

8. A module capable of being secured within a host system comprising:
   a housing;
   an optical communications receptacle attached to said housing capable of physically receiving a corresponding optical communications connector;
   a latching mechanism attached to said housing comprising:
     a recess for accommodating a latch of the host system;
     a slidable latch key attached to said housing that at least partially occupies the recess in a first position preventing the latch of the host system from engaging the module and that is withdrawn from the recess in a second position allowing the latch to engage the module;
     a horizontal shaft attached to said module across its width; and
     a bail that is rotates around the shaft so as to move the latch key between the first position and the second position.

9. The module of claim 8 wherein the movement of the latch key from the second position to the first position causes the latch of the host to be displaced from the recess and so causes the latch to engage the module if such a latch is engaged.

10. The module of claim 8 further comprising a latch boss, wherein the position of the latch boss is fixed with respect to the housing.

11. The module of claim 8 wherein the latch key moves along a plane.

12. The module of claim 8 wherein the bail is made of plastic.

13. An electronic module comprising:
   a housing;
   an optical communications receptacle attached to said housing capable of physically receiving a corresponding optical communications connector;
   a latching mechanism attached to said housing comprising:
     a latch boss whose position is fixed with respect to the housing;
     a movable latch key that slides alone a plane within a recess in the module; and
     a bail that moves the latch key.

14. The module of claim 13 wherein the latch key displaces a latch when the latching mechanism is not latched and the latch key does not displace a latch when the latch key is in the latched position.

15. A method of physically retaining an optical module within a host cage comprising:
   moving the module into a predetermined location substantially within the host cage to allow engagement of a latch mechanism;
   rotating a bail portion of the latch mechanism such that a latch key portion slides along a plane within a recess in the module to allow a latch of the host to engage a latch boss, said latch boss having a fixed position with respect to the module; and
   locking the module in position by placing the bail in a retained position where it is held allowed the latch of the host to engage the latch boss and thus physically prevent removal of the module.

16. A latching mechanism for retaining an optical module within a host comprising:
   a host portion and a module portion, the host portion comprising:
     a spring biased member with an opening to engage the module portion the module portion comprising:
     a latch boss whose position is fixed with respect to the module and which is so disposed so as to be engaged by said opening;
     a latch key that slides and thereby causes the host portion to be displaced; and
     a bail that rotates and thereby causes the latch key to slide.

* * * * *

UNITED STATES PATENT AND TRADEMARK OFFICE
CERTIFICATE OF CORRECTION

PATENT NO.    : 6,929,403 B1
DATED         : August 18, 2005
INVENTOR(S)   : Arciniegas, German et al.

It is certified that error appears in the above-identified patent and that said Letters Patent is hereby corrected as shown below:

Column 7,
Line 55, delete "is" before "rotates".

Signed and Sealed this

Eighth Day of November, 2005

JON W. DUDAS
*Director of the United States Patent and Trademark Office*